United States Patent [19]

Muijs et al.

[11] Patent Number: 5,062,970

[45] Date of Patent: Nov. 5, 1991

[54] SURFACTANT COMPOSITION

[75] Inventors: Herman M. Muijs; Nicolaas C. M. Beers; Sebastianus P. F. M. Roefs, all of Amsterdam, Netherlands

[73] Assignee: Shell Oil Company, Houston, Tex.

[21] Appl. No.: 532,546

[22] Filed: Jun. 4, 1990

[30] Foreign Application Priority Data

Jun. 6, 1989 [GB] United Kingdom ................ 8912963

[51] Int. Cl.$^5$ .............................................. E21B 43/22
[52] U.S. Cl. ................... 252/8.554; 166/270; 166/271; 166/272; 166/273; 166/274; 166/275; 166/303; 252/8.551
[58] Field of Search ............... 166/270–275, 166/303; 252/8.551, 8.554

[56] References Cited

U.S. PATENT DOCUMENTS

| 3,601,197 | 8/1971 | Ayers et al. | 166/307 |
| 3,799,263 | 3/1974 | Prillieux et al. | 166/275 |
| 3,861,466 | 1/1975 | Gale | 166/273 |
| 3,885,626 | 5/1975 | Gale et al. | 166/273 |
| 4,125,158 | 11/1978 | Waite et al. | 166/273 |
| 4,414,119 | 11/1983 | Duke, Jr. | 252/8.554 |
| 4,452,708 | 5/1984 | Aldrich et al. | 252/8.554 |
| 4,463,806 | 8/1984 | Hurd | 166/274 |
| 4,608,204 | 8/1986 | Lew et al. | 252/8.554 |
| 4,609,474 | 9/1986 | Reisberg et al. | 252/8.55 |
| 4,682,653 | 7/1987 | Angstadt | 166/303 |
| 4,743,385 | 5/1988 | Angstadt et al. | 252/8.554 |
| 4,773,484 | 9/1988 | Chang et al. | 166/274 |
| 4,891,155 | 1/1990 | Fernley et al. | 252/8.554 X |
| 4,932,473 | 6/1990 | Borchardt | 166/275 |

Primary Examiner—Robert L. Stoll
Assistant Examiner—Chhaya Sayala

[57] ABSTRACT

A surfactant composition, suitable for enhanced oil recovery comprising in a 60:40 to 10/90 weight ratio a) (o,m)- and/or (o,p)-dialkylbenzene alkali sulfonate and b) polyalkoxyphenyl ether alkali sulfonate.

9 Claims, 2 Drawing Sheets

SURFACTANT COMPOSITION

FIELD OF THE INVENTION

The invention relates to a surfactant composition, suitable for enhanced oil recovery and to a method for enhancing oil recovery.

BACKGROUND OF THE INVENTION

It is well known in the art of oil production that only a portion of the oil present in subterranean oil reservoirs can be recovered by direct methods, also called primary recovery techniques. A portion of the oil which is not recoverable by primary recovery techniques, can be recovered by secondary recovery techniques. The latter techniques include the use of a displacement fluid e.g. water, which is injected into the oil reservoir or into the vicinity of the reservoir.

If after application of the secondary recovery techniques an appreciable amount of oil is still retained in the reservoir, it is still possible to recover a part of that oil from that reservoir.

This oil, in the form of immobile, capillary-trapped droplets, can be mobilized by injection of suitable surfactant solutions; these interact with the oil to form a micro-emulsion that reduces the capillary trapping forces to a very low level. The process is called surfactant flooding.

Once mobilized, the oil forms a growing bank that leaves almost no oil behind in the flooded part of the reservoir. Since the oil bank precedes the surfactant bank it is not necessary to inject surfactant continuously throughout the flood. So when a certain volume of surfactant solution has been injected, it may be followed by a cheaper fluid, such as viscous water; and later water alone. The injection of the surfactant, viscous water and water involves the displacement of oil to the production well. The micro-emulsion on its turn is displaced in the direction of the production well by the viscous water. Consequently a number of moving zones and banks is developing in the oil reservoir and as long as the micro-emulsion is intact, oil can be recovered.

Surfactants are soaps or soap-like chemicals. Their molecules consist of a hydrophilic part, attracted to water, and a lipophilic part, attracted to oil. Because of this amphiphilic nature, even at small concentrations, they can greatly reduce the interfacial tension between oil and water and form micro-emulsions.

It is a problem to recover the oil from deeper reservoirs, since at ever increasing depths the temperature becomes higher and the micro-emulsion breaks down in oil and water, whereby the oil is again trapped in the pores. The micro-emulsions formed by oil, surfactant and water are thus not stable enough to withstand the higher temperatures.

It is an object of the invention to find surfactant compositions which are able to form micro-emulsions which are stable at high temperatures as well as at low temperatures and which over a broad temperature range are in equilibrium with their environment and do not deteriorate.

SUMMARY OF THE INVENTION

The present invention therefore relates to a surfactant composition, suitable for enhanced oil recovery, which comprises:

a) a dialkylated benzenesulfonate of the chemical formula

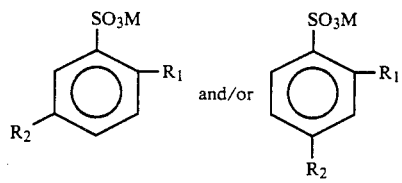

wherein M is an alkali metal and $R_1$ and $R_2$ are the same or different $C_2$-$C_{20}$ alkyl groups, and b) a polyalkoxyphenylethersulfonate of the chemical formula

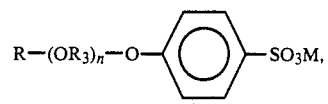

wherein M is an alkali metal, R is a $C_9$-$C_{22}$-alkyl group and $R_3$ is a $C_1$-$C_4$-alkylene group, and n is an integer from 1 to 20, the weight ratio of a:b being in the range of from 60:40 to 10:90.

DESCRIPTION OF THE PREFERRED EMBODIMENTS

Preferred compostions are those wherein M is sodium and wherein $R_1$ and $R_2$ independently are $C_6$-$C_{14}$-alkyl groups.

In a more preferred composition according to the invention R is a $C_{10}$-$C_{18}$-alkyl group, $R_3$ is an ethylene group and n is an integer of from 1 to 5 and the dialkylated benzene sulfonate predominantly contains the two alkyl groups situated in the para position to each other.

In a preferred surfactant composition according to the invention, the weight ratio of the dialkylated benzenesulfonate and polyalkoxy phenylethersulfonate lies between 50:50 and 15:85, preferably between 40:60 and 20:80. The surfactant composition may comprise a thickener, e.g. a polysaccharide.

The invention further relates to a method of enhancing recovery of oil from a subterranean oil-containing reservoir, which method comprises injecting into the reservoir an aqueous solution of the surfactant composition, displacing said aqueous solution within said subterranean reservoir, and recovering oil from the reservoir. This procedure can be applied after the water-flooding or already in an early stage of the water-flooding, the latter called the surfactant enhanced water-flooding.

The surfactant composition according to the invention has an excellent solubility in cold seawater (20° C.) as well as in seawater at reservoir conditions (95° C.). When oil is present, a type III phase behavior or middle phase is generated which is highly active, thus a low interfacial tension between oil and micro-emulsion water exists.

The surfactant composition according to the invention is not sensitive to fluctuations in temperature and salinity.

Figure 1:
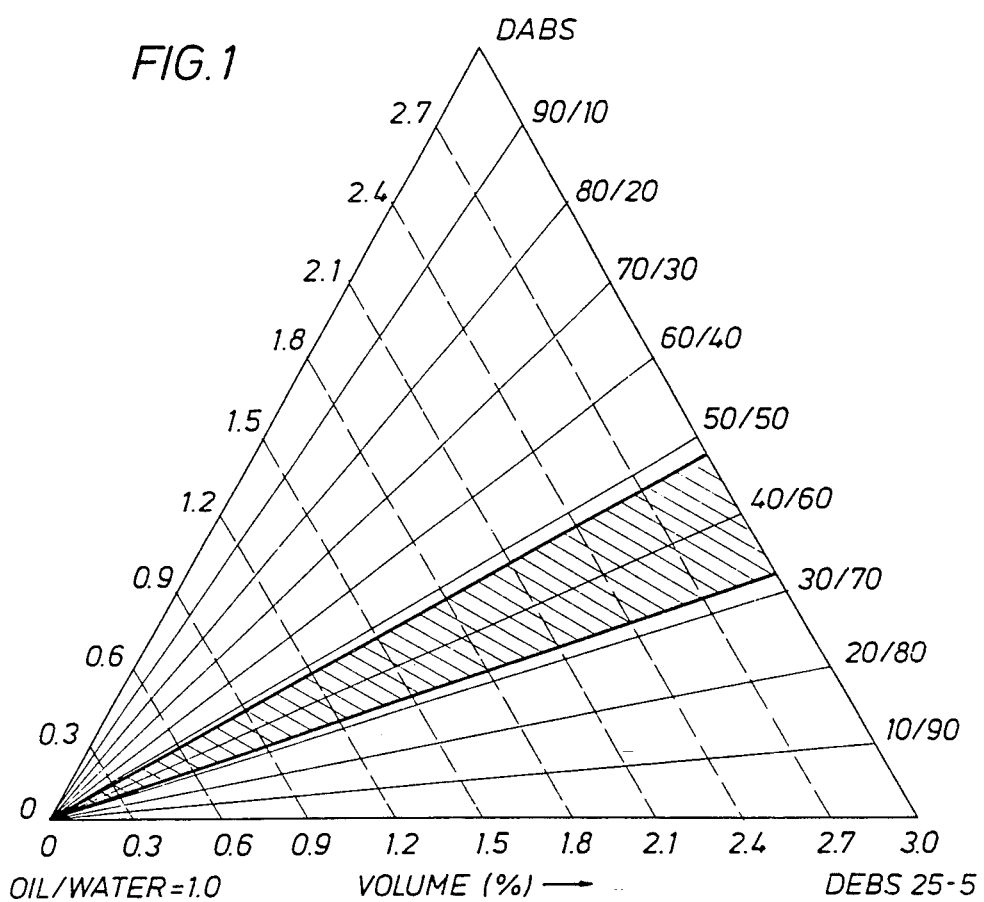
FIG. 1 is a phase diagram of a composition according to the invention.

In FIG. 1 is disclosed a phase diagram of a composition according to the invention, given on the right leg of the triangle. On its basis is given the volume percentage (gram surfactant per 100 ml water), while the oil/water ratio is 1.

Temperature measurements are all at 95° C. As water seawater is taken. The hatched part of the phase diagram includes the compositions which form a microemulsion in equilibrium with both water and oil; consequently in the hatched part a 3-phase system exists. Outside the hatched part a one-phase or two-phase system exists.

On the top of the triangle is given 100% weight of $C_8$–$C_{10}$-dialkylated sodium benzene sulfonate (DABS), while below on the right is given 100% weight of the $C_{12}$–$C_{15}$-alcoholethoxy sodium benzene sulphonate (containing 5 ethoxy groups per molecule), abbreviated DEBS 25-5.

The hatched area of the phase diagram coincides with a single phase area in a phase diagram of seawater/DABS and DEBS 25-5, without oil, at 95° C. as well as at 20° C. The formulations can be injected at 20° C.

The invention will now be described further by means of the following example which is illustrative and is not intended to be construed as limiting the scope of the claimed invention.

EXAMPLE

A surfactant composition according to the invention was tested on its oil production performance in an outcrop sandstone (Bentheim core) at 95° C.

The composition comprised the same surfactants as disclosed above in relation with FIG. 1, namely $C_8$–$C_{10}$-dialkylated sodium benzene sulfonate (DABS) and $C_{12}$–$C_{15}$-alcohol ethoxy sodium benzene sulfonate (DEBS 25-5) in a concentration of 12.76 g/l and 20.83 g/l respectively.

The properties of the Bentheim core were as follows.

| Length | 31.0 cm |
|---|---|
| Area | 24.0 cm² |
| Porosity | 20.7% |
| Pore volume | 154.0 ml |
| Permeability | 1300 mD(arcy) |
| $K_{ocw}$ | 440 mD |
| $K_{wor}$ | 80 mD |
| $S_{cw}$ | 29% |
| $S_{or}$ | 43% |

Figure 2:
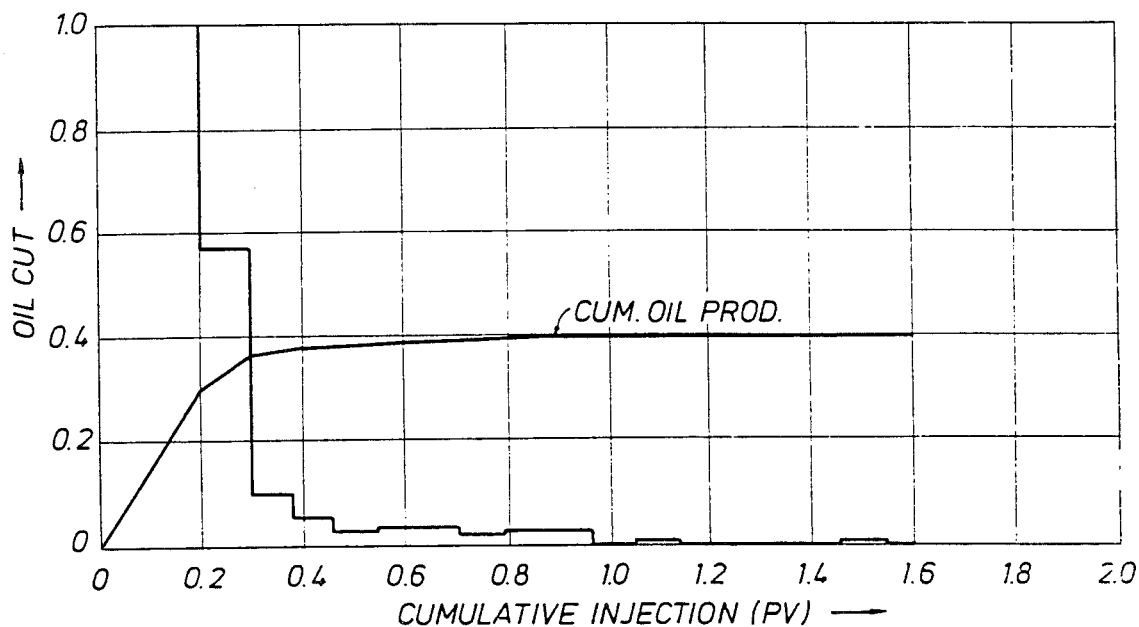
FIG. 2 shows the production performance of the waterflood carried out in the example.

The Bentheim core was firstly saturated with seawater, brought to connate water saturation by injecting North Sea crude oil and was followed by a seawater drive. The result of this flood is found in FIG. 2. The cumulative recovery is 39% of the oil initially in place (OIIP). OIIP was 70.8% of PV.

Figure 3:
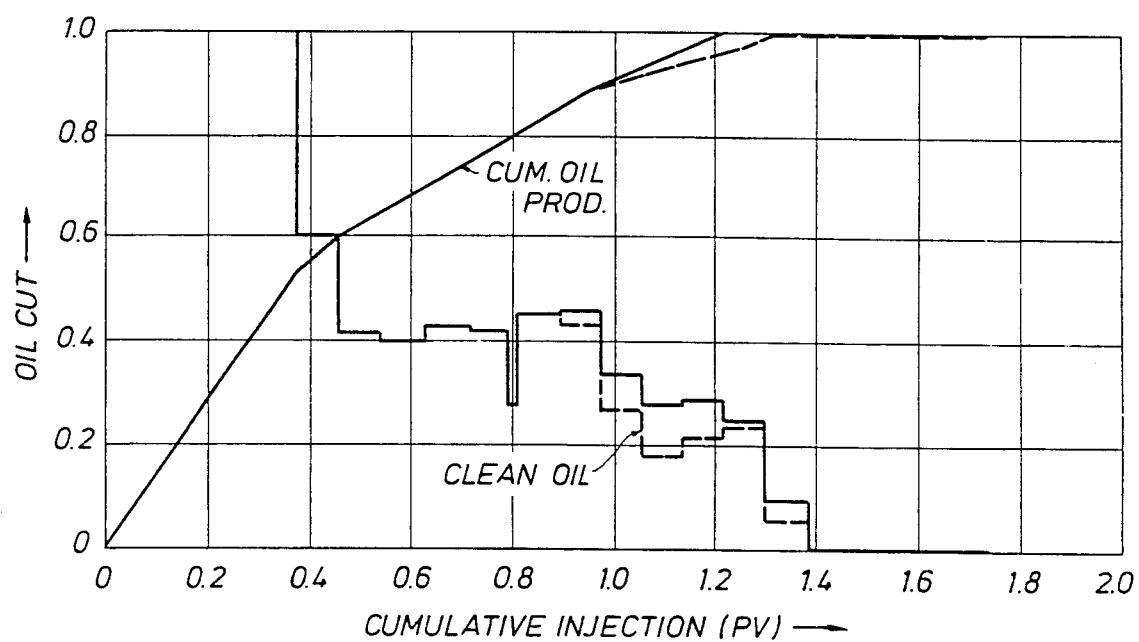
FIG. 3 shows the production performance of the surfactant flood carried out in the example.

For the subsequent surfactant drive, the core was resaturated with crude oil until the connate water saturation was restored. The surfactant composition was injected (total volume 1.75 PV (pore volume)). The result of the surfactant flood is given in FIG. 3. Water breakthrough occurred after 0.39 PV injection, compared with 0.24 PV for the water drive. The subsequent oil bank was produced with an oil cut of 43% and lasted until 1.0 PV total injection. Thereafter clean oil continued to be produced at an average oil cut of 22% during 0.3 PV. An oil-containing micro-emulsion was produced over a period of about 0.4 PV. If oil present in the micro-emulsion was included, the oil recovery reached 100% at 1.4 PV.

| DATA OF THE VERTICAL SURFACTANT FLOOD EXPERIMENT | | |
|---|---|---|
| WATERFLOOD | | |
| Moveable pore volume | (PV) | 0.28 |
| Water breakthrough | (PV) | 0.24 |
| Oil production at breakthrough | (% OIIP) | 32 |
| Ultimate waterflood recovery | (% OIIP) | 39 |
| $S_{or}$ | (%) | 43 |
| SURFACTANT FLOOD | | |
| Water breakthrough | (PV) | 0.39 |
| Cum. clean oil production at: | 1.0 PV | 91 |
| (% OIIP) | 1.2 PV | 97 |
|  | 1.4 PV | 100 |
| Cum. total oil production at: | 1.0 PV | 91 |
| (% OIIP) | 1.2 PV | 98 |
|  | 1.4 PV | 100 |

What is claimed is:

1. A surfactant composition suitable for enhanced oil recovery which comprises:

a) a dialkylated benzenesulfonate having a chemical formula selected from the group consisting of

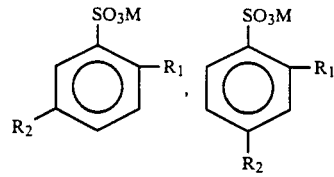

and mixtures thereof, wherein M is an alkali metal and $R_1$ and $R_2$ are the same or different $C_2$–$C_{20}$ alkyl groups, and b) a polyalkoxyphenylethersulfonate of the chemical formula

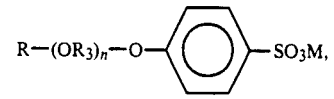

wherein M is an alkali metal, R is a $C_9$–$C_{22}$-alkyl group and $R_3$ is a $C_1$–$C_4$-alkylene group, and n is an integer from 1 to 20, wherein the weight ratio of a:b is in the range of from about 60:40 to about 10:90.

2. The surfactant composition of claim 1 wherein M is sodium.

3. The surfactant composition of claim 1 wherein $R_1$ and $R_2$ independently are $C_6$–$C_{14}$-alkyl groups.

4. The surfactant composition of claim 1 wherein the dialkylated benzene sulfonate predominantly contains the two alkyl groups situated in the para position to each other.

5. The surfactant composition of claim 1 wherein R is a $C_{10}$–$C_{18}$-alkyl group, $R_3$ is an ethylene group and n is an integer of from 1 to 5.

6. The surfactant composition of claim 1 wherein the weight ratio of the dialkylated benzenesulfonate and polyalkoxy phenylethersulfonate is between 50:50 and 15:85, preferably between 40:60 and 20:80.

7. The surfactant composition of claim 1 wherein a thickener is present.

8. The surfactant composition of claim 7 wherein a polysaccharide is used as thickener.

9. A method of enhancing recovery of oil from a subterranean oil-containing reservoir, which method comprises injecting into the reservoir an aqueous solution of a surfactant composition comprising:

a) a dialkylated benzenesulfonate having a chemical formula selected from the group consisting of

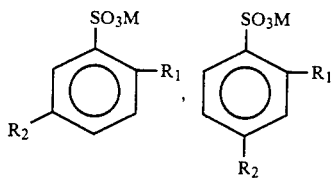

and mixtures thereof, wherein M is an alkali metal and $R_1$ and $R_2$ are the same or different $C_2$-$C_{20}$ alkyl groups, and b) a polyalkoxyphenylethersulfonate of the chemical formula

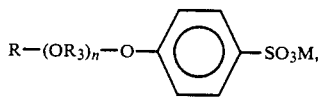

wherein M is an alkali metal, R is a $C_9$-$C_{22}$-alkyl group and $R_3$ is the ratio of a:b is in the range of from about 60:40 about 10:90, displacing said aqueous solution within said subterranean reservoir, and recovering oil from the reservoir.

* * * * *